S. B. WINN.
LOCKING DEVICE FOR TRACTOR AND TRAILER COUPLING MECHANISM.
APPLICATION FILED JUNE 3, 1918.
1,372,922.
Patented Mar. 29, 1921.
2 SHEETS—SHEET 1.
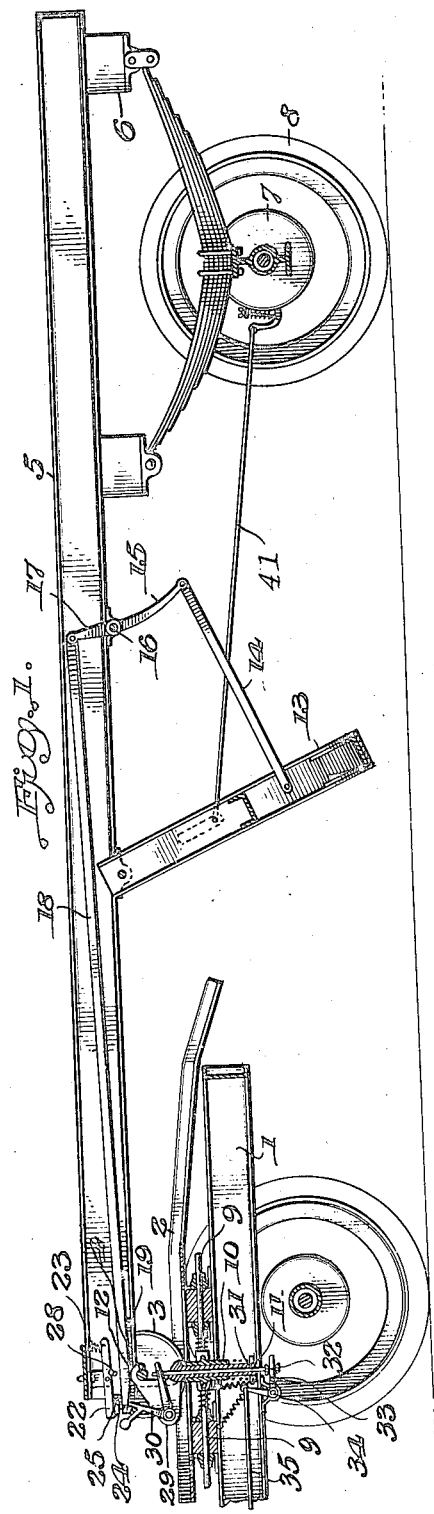
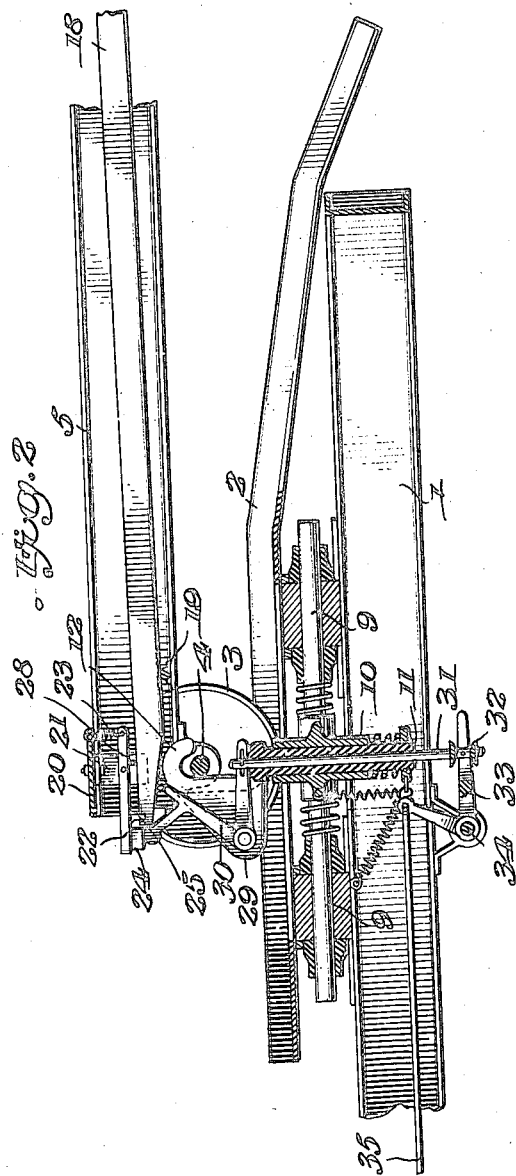
INVENTOR
Sidney B. Winn,
BY 
ATTORNEY S. B. WINN.
LOCKING DEVICE FOR TRACTOR AND TRAILER COUPLING MECHANISM.
APPLICATION FILED JUNE 3, 1918.
1,372,922.
Patented Mar. 29, 1921.
2 SHEETS—SHEET 2.
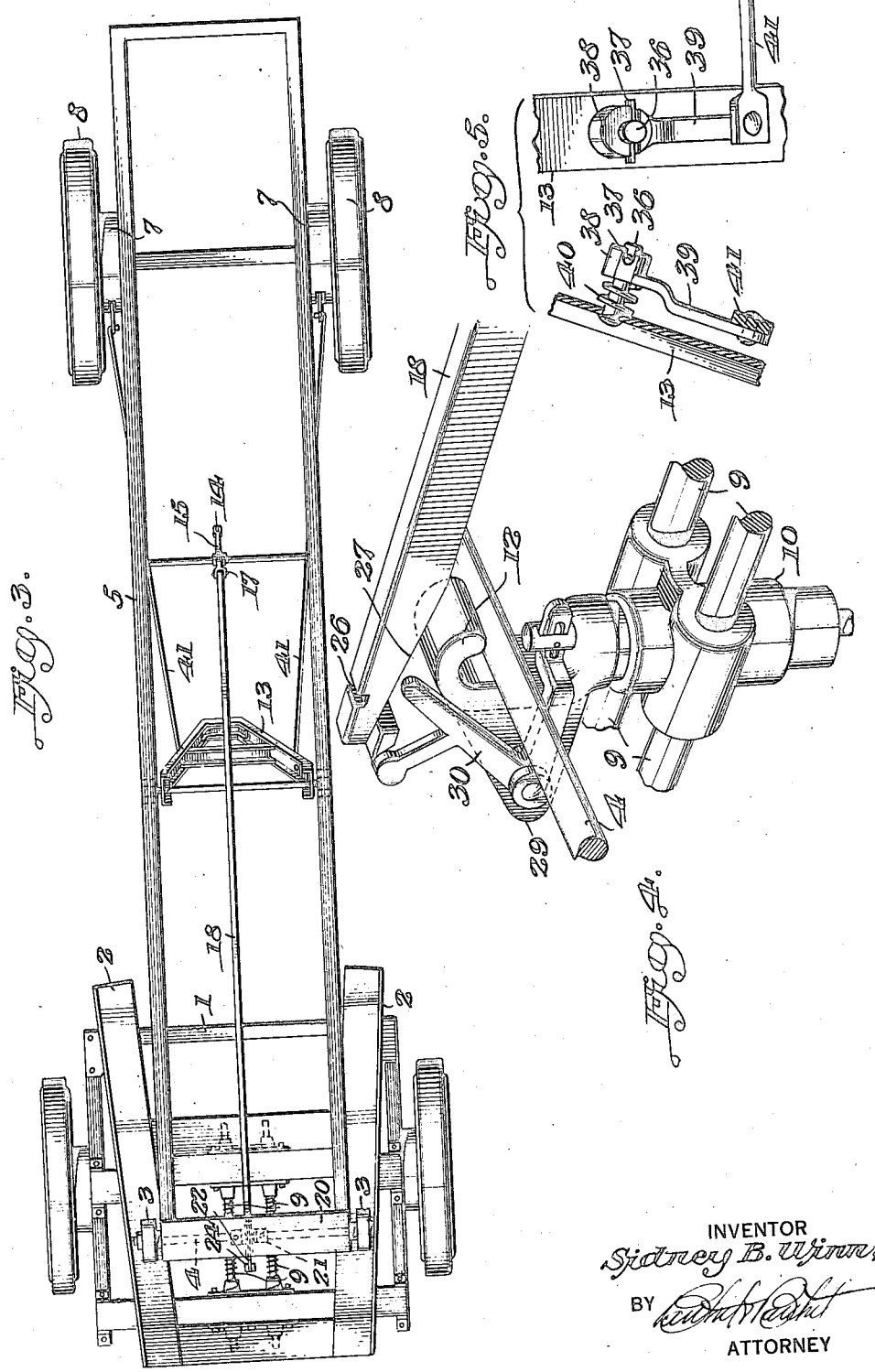
INVENTOR
Sidney B. Winn,
BY 
ATTORNEY

UNITED STATES PATENT OFFICE.

SIDNEY B. WINN, OF LAPEER, MICHIGAN, ASSIGNOR TO LAPEER TRACTOR-TRUCK COMPANY, OF LAPEER, MICHIGAN, A CORPORATION OF MICHIGAN.

LOCKING DEVICE FOR TRACTOR AND TRAILER COUPLING MECHANISM.

1,372,922.   Specification of Letters Patent.   Patented Mar. 29, 1921.

Application filed June 3, 1918. Serial No. 237,974.

*To all whom it may concern:*

Be it known that I, SIDNEY B. WINN, a citizen of the United States of America, residing at Lapeer, in the county of Lapeer and State of Michigan, have invented certain new and useful Improvements in Locking Devices for Tractor and Trailer Coupling Mechanism, of which the following is a specification, reference being had therein to the accompanying drawings.

This invention relates to a locking device for mechanism employed for coupling a trailer or similar vehicle to a tractor or truck, and my invention aims to provide a locking device which will preclude any danger of a trailer being moved, unless positively coupled to a tractor.

My invention will be hereinafter specifically described and then claimed, and reference will now be had to the drawings, wherein—

Figure 1 is a longitudinal sectional view of the trailer and a portion of a tractor, showing the coupling means between the two vehicles in a locked position;

Fig. 2 is an enlarged longitudinal sectional view of a portion of the same, showing the coupling means in an unlocked position;

Fig. 3 is a plan of the trailer and a portion of the tractor;

Fig. 4 is a perspective view of the trailer coupling means, and

Fig. 5 shows detailed views of brake releasing devices.

In the drawings, the reference numeral 1 denotes a portion of a tractor frame having a track 2 adapted to receive wheels 3 on the ends of an axle 4, carried by the forward end of a trailer frame 5, said trailer frame having the rear end thereof provided with a suitable truck 6 having a brake mechanism 7 for the wheels 8 of said truck.

On the tractor frame 1 is a draft mechanism 9 including a support 10 and a tubular king bolt 11, said king bolt having the upper end thereof provided with a hook shaped head 12 adapted to receive the axle 4. The king bolt 11 is normally elevated so that the head 12 may receive the axle 4 when the end of the tractor frame 1 is backed under the forward end of the trailer frame 5.

Intermediate the ends of the trailer frame 5 is a pivoted supporting leg 13 adapted when lowered and engaging the ground to support the forward end of the trailer frame, when the tractor is withdrawn. The supporting leg 13 is connected by a link 14 to the crank 15 of a rock shaft 16, said rock shaft being supported transversely of the trailer frame 5. The rock shaft 16 has another crank 17 and said crank is connected to the rear end of a locking bar 18. The locking bar 18 is disposed longitudinally and centrally of the trailer frame 5 and the forward end of said locking bar rests on a roller 19 supported by the trailer frame.

On the forward end of the trailer frame 5 is a transverse member 20 provided with a depending bearing 21 and pivotally connected to said depending bearing is a latch 22, said latch having the rear end thereof connected to the member 20 by a retractile spring 23, and the forward end of said latch has lugs 24 and 25. The lug 25 is adapted to engage in the notch 26 in the upper edge of the locking bar 18, and to hold said locking bar in a retracted position with the supporting leg 13 lowered. The lower edge of the locking bar 18, at the forward end thereof, is beveled, as at 27, so as to ride on to and depress the head 12 of the king bolt 11, thereby locking the head of the king bolt in engagement with the axle 4 of the trailer. The locking bar 18 is shifted forward by raising the supporting leg 13, said locking bar riding under a roller or pin 28 carried by the bearing 21. This however cannot be accomplished until the lug 25 is removed from the notch 26 and to elevate the forward end of the latch 22 a novel mechanism is associated with the king bolt 11.

The head 12 of the tubular king bolt 11 has a forward extension 29 and pivotally connected thereto is a bell-crank 30. One arm of the bell crank 30 is adapted to engage the lug 24 and raise the forward end of the latch 22, and the other arm of said bell crank is slotted and connected to a rod 31 extending upwardly through the tubular king bolt 11. The lower end of the rod 31 is loosely connected, as at 32 to a bell crank 33 on a rock shaft 34, journaled in bearings carried by the tractor frame 1. The bell crank 33 is connected to a forwardly extending rod 35 and by pulling on this rod, the rod 31 may be elevated to actuate the bell crank 30 and shift the latch 22 to unlock the locking bar 18.

The supporting leg 13 has the sides thereof provided with studs 36 having transverse pins 37, and on the studs are the heads 38 of cranks 39. The crank heads 38 are slotted to receive the transverse pins 37 and said heads are normally held in engagement with the pins 37 by coiled compression springs 40 interposed between said heads and the sides of the supporting leg, said springs encircling the studs 36. The cranks 39 are connected by rods 41 to the brake mechanism 7 of the truck 6 so that when the supporting leg 13 is lowered, the brakes will be set to prevent the trailer from being moved until a tractor is coupled thereto. However it is often desirable to move the trailer, particularly when empty, without a tractor, so by shifting the cranks 39 out of engagement with the pins 37 of the studs 36, the brake mechanism will be released and the trailer may be moved about.

Considering the use of the locking device for the coupling means of the tractor and trailer, I will assume that the trailer is loaded and the tractor has been backed under the forward end thereof. Immediately upon the head of the king bolt 11 engaging the axle 4 of the trailer, then the operator of the tractor pulls upon the rod 35 and elevates the rod 31, which actuates the bell crank 30 and shifts the latch 22, thereby releasing the locking bar 18. Now, when the supporting leg 13 is raised, the locking bar is pushed forwardly to depress the head 12 of the tubular king bolt 11, thereby locking the head of the king bolt in engagement with the axle 4. The trailer may now be safely moved by the tractor.

What I claim is:—

1. The combination of a tractor, a trailer, a coupling device connecting the forward end of said trailer to the rear end of said tractor, a locking bar carried by said trailer, adapted for locking the coupling device, means carried by said trailer adapted for holding said locking bar in a retracted position, and means operatable through said coupling device adapted for releasing said locking bar holding means.

2. The combination of a tractor, a trailer, a coupling device adapted to connect the forward end of said trailer to the rear end of said tractor, a locking bar carried by said trailer and adapted for locking said coupling device, a latch carried by said trailer adapted to engage said locking bar and hold said bar in a retracted position and a supporting leg carried by said trailer and adapted for shifting said locking bar.

3. In combination, a tractor, a trailer, a coupling device adapted to connect the trailer and tractor, locking means for such coupling device, means carried by the trailer for holding the locking means inactive, and means carried by the tractor for releasing said holding means at will.

4. In tractor-trailer structures wherein the trailer is detachably engageable with the tractor to provide trailer support during traction, and wherein the trailer is provided with a rest member shiftable between an inactive position and a position to support the trailer when disengaged, means operative to shift the rest member from inactive to active position, said means being operative to maintain the engagement of tractor and trailer when the rest member is in inactive position.

5. In tractor-trailer structures, wherein the trailer is detachably engageable with the tractor to provide trailer support during traction, and wherein the trailer is provided with a rest member shiftable between an inactive position and a position to support the trailer when disengaged, means operative to shift the rest member from inactive to active position, said means being operative to maintain the engagement of tractor and trailer when the rest member is in inactive position, control mechanism operative to retain said means against movement when the rest member is in active position, and mechanism carried by the tractor and operable at will to release such control mechanism when the tractor and trailer are in position for engagement.

In testimony whereof I affix my signature in the presence of two witnesses.

SIDNEY B. WINN.

Witnesses:
 E. E. MIX,
 G. R. BUCK.